(12) United States Patent
Grabowski

(10) Patent No.: US 8,480,873 B2
(45) Date of Patent: Jul. 9, 2013

(54) ELECTRODEIONIZATION DEVICE AND METHOD COMPRISING CONTROL OF THE ELECTRIC CURRENT BY MEASUREMENT OF ION-EXCHANGE MATERIAL EXPANSION

(75) Inventor: Andrej Grabowski, Montigny le Bretonneux (FR)

(73) Assignee: EMD Millipore Corporation, Billerica, MA (US)

(*) Notice: Subject to any disclaimer, the term of this patent is extended or adjusted under 35 U.S.C. 154(b) by 210 days.

(21) Appl. No.: 13/155,505

(22) Filed: Jun. 8, 2011

(65) Prior Publication Data
US 2012/0138467 A1    Jun. 7, 2012

(30) Foreign Application Priority Data
Jul. 1, 2010 (EP) .................................. 10290370

(51) Int. Cl.
*B01D 61/48* (2006.01)
(52) U.S. Cl.
USPC ........................... 204/519; 204/628; 205/688
(58) Field of Classification Search
USPC .................................. 204/519, 628; 205/688
See application file for complete search history.

(56) References Cited

U.S. PATENT DOCUMENTS
7,264,737 B2    9/2007  Godec et al.
2004/0060823 A1  4/2004  Carson et al.
2006/0231406 A1* 10/2006 Freydina et al. ............. 204/632
2008/0156710 A1  7/2008  Onota et al.
2008/0308482 A1 12/2008  Tajima et al.

FOREIGN PATENT DOCUMENTS
EP    0862942 A2    9/1998
EP    0919178 A2    6/1999
EP    1048776 A2   11/2000
EP    1804150 A1    7/2007

OTHER PUBLICATIONS

European Search Report dated Dec. 10, 2010 in corresponding foreign patent application No. EP 10290370.
Analytica Chimica Acta, vol. 249, No. 2, (1991) pp. 373-380, XP026595272, "Fiber-optic sensor for salt concentration based on polymer swelling coupled to optical displacement", McCurley, et al.

* cited by examiner

Primary Examiner — Arun S Phasge
(74) Attorney, Agent, or Firm — Nields, Lemack & Frame, LLC

(57) ABSTRACT

Device for the removal of ions from a polar liquid, e.g. water, including at least one compartment which includes at least one inlet for an entering polar liquid flow and at least one outlet for an outgoing deionized liquid flow, in which the compartment an electrochemically regenerable ion-exchange material fills a zone through which zone a liquid flow is able to pass, the device including one sensor of at least one dimensional change of the ion-exchange material. The sensor can include a photo-sensor or a sensor of mechanical stress. Preferably an apparatus connected to the sensor is able to analyze this dimensional change and to control the electric current. Also disclosed is a method of using the device, whereby the electrical current applied to the device is controlled according to the expansion of the resin.

13 Claims, 3 Drawing Sheets

Figure 1:
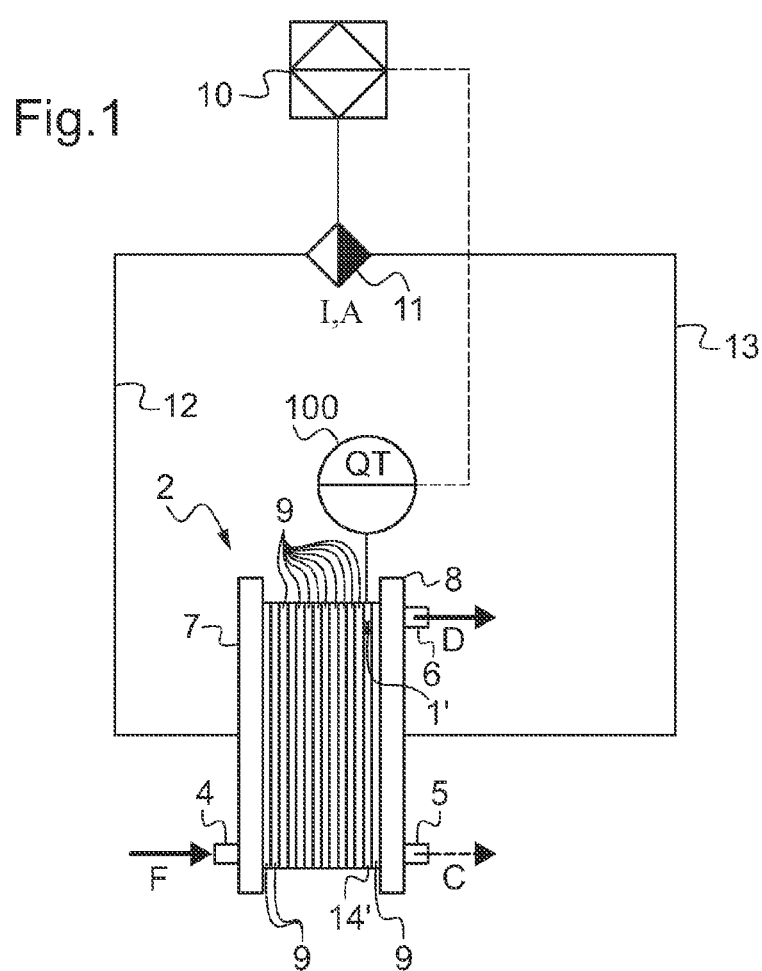

ELECTRODEIONIZATION DEVICE AND METHOD COMPRISING CONTROL OF THE ELECTRIC CURRENT BY MEASUREMENT OF ION-EXCHANGE MATERIAL EXPANSION

The present invention pertains to a specialized electrodeionization (EDI) device and method. Such devices and methods are employed for the production of an at least partially deionized liquid from a polar liquid feed stream.

Herein, "deionized" means "deanionized", "decationized", or "completely deionized" (that is to say de-anionized and de-cationized) whatever degree of deionization is achieved.

Continuous or non-continuous EDI is known in the art as a process which removes, at least partially, ionized and ionizable species from polar liquids, such as water, using electrically active media and an electric potential difference to drive ion transport. Deionization takes place in at least one diluate compartment of EDI, which is a compartment in the electrochemical device where purification, i.e. removal of contaminants, occurs.

EDI relates currently to standard water deionization techniques. Its original principle, i.e. the use of a mixed bed ion-exchange resin in the diluate compartment of an electrodialysis stack, has been commercialized by Millipore Corporation since 1987.

Generally, an EDI module comprises at least one couple of electrodes and compartments, which may be separated by membranes, the diluate compartment(s) being filled with an ion-exchange material. Typically, the compartments are alternating diluate and concentrate compartments and the membranes separating these compartments are ion-exchange membranes, generally alternating anion- and cation-exchange membranes. Compartments comprising the electrodes, i.e. electrode compartments, can act as diluate or as concentrate compartments, depending on the concept.

The ion-exchange materials are generally cation- and anion-exchange materials in the form of beads (conventional ion-exchange resins), powders, fibers (woven or non-woven textiles) and porous blocks. They fill a certain volume as a bed in a compartment, and allow a stream of fluid to flow through the void volume as well as the electric current of ions be conducted through the ion-exchange material. They are generally referred to as "resins".

Different arrangements of ion-exchange materials in diluate compartment of an EDI are possible in the prior art. The original arrangement is a mixed bed of ion-exchange resins. An alternative arrangement is the alternance of layers of cation- and anion-exchange resins, called layered beds. The use of cation-exchange resin and anion-exchange resin in completely separated diluate compartments, electrochemically regenerated in a continuous mode, is also known. In certain schemes, the feed aqueous solution flows through the cation-exchange resin and anion-exchange resin beds in series and the $H^+$ and $OH^-$ ions produced for example in the electrode reactions are used for regeneration of resins.

In known methods of EDI and related devices with electrochemical regeneration of ion-exchange material, the liquid flow is fed in and streams out of every compartment separately or is distributed between the parallel compartments of a module through the common collector placed outside the compartments. Typical liquid used as feed is pre-treated water, such as reverse osmosis permeate.

When an electrical voltage is applied between electrodes, the electric current of ions is conducted mainly through this ion-exchange material. The removal of ions from the feed stream is carried out directly into the ion-exchange material, where they are exchanged with $H^+$- or $OH^-$-ions. During regeneration, generated $H^+$ and $OH^-$ ions, e.g. generated by electrochemically enhanced water dissociation, regenerate corresponding ion-exchange material while producing a concentrate as waste. A specific regeneration degree of resins is usually required to provide sufficient removal of ionic contaminants from the ion-exchange material and, in case of application in water deionization, to produce water of high resistivity. If the regeneration degree of resins is not high enough, the resistivity of the diluate, that is to say the quality of produced water, will decrease.

At a fixed feed water flow rate and composition, i.e. concentration of all contaminants, the regeneration degree of ion-exchange material is proportional to the direct electric current. It should be mentioned that the resin in regenerated form, i.e. in $H^+$-ion form for cation-exchange resin and in $OH^-$-ion form for anion-exchange resin, swells stronger, i.e. has more volume than in its (original) salt form.

If the diluate compartment of an EDI module is completely filled by resin, the increase of regeneration degree of said resin results in an expansion of the resin and a mechanical stress on the walls of the compartment. This stress results in compressive strain on the elements forming the compartment, i.e. it deforms membranes, frames, flow distributors, etc. This can lead to internal or external leaks. Moreover the maintaining of an electric current at a level significantly higher than one sufficient to keep the required regeneration degree would result in excessive energy consumption.

On the other hand, if the regeneration degree and volume of bed decrease, then the compartment can not be filled completely with the resin bed, and that can result in an increase of electrical resistance in the void area, fluidization of resin bed and weak mechanical support of the membranes. All these phenomena are not advantageous for the module performance and its life time. Moreover, an electric current strength, which is not high enough to create a sufficient regeneration of resins and removal of contaminants, would result in a poor water quality produced.

Thus, for sustainable and reliable operation of an EDI module, a correct adjustment of current is required in order to prevent the above mentioned drawbacks.

Usually when the parameters of the feed water are measured, such as conductivity and concentrations of dissolved $CO_2$ and silicium for reverse osmosis permeate, an optimal electric current for the EDI can be calculated, taking into account a fixed flow rate. However, the characteristics of feed water can change over time which may be caused by the instability of upstream treatment or by quality changes of water used by the system. Furthermore, the flow rate through the EDI apparatus can vary during the life-time of the device. Due to all these possible changes, the set electric current can deviate from the optimal one and this can cause malfunction.

Some prior art documents have pointed out the importance of electric current control in an EDI device. Different parameters are usually monitored as a signal for the control of the electric current.

For example, patent application US 2004/060823 discloses a method for automatically controlling the set electric current through an EDI unit. The ionic load of the water being fed to the unit is continuously monitored by measuring the feed water conductivity and using the output of the conductivity meter to automatically adjust the electric current through the EDI unit. The limitation of the method is that the conductivity measurement estimates only the content of ionized species and not of ionizable molecules. The concentration of $CO_2$, which is an ionizable molecule, is usually comparable with concentration of salt ions in a typical composition of EDI feed water. Thus, the regulation of current according to this method is not satisfactory.

U.S. Pat. No. 7,264,737 B2 discloses a water treatment system including a boron analyzer. A controller responds to a boron concentration detected in the water produced, by adjusting the current or voltage in the EDI unit and maintaining a portion of ion-exchange resin in the diluate compartment in a substantially regenerated state. However online boron-analyzers are expensive and they require special maintenance, thus their use according to this patent is not an easy solution for the one skilled in the art.

In US 2008/0156710 A1, a water producing apparatus with an EDI device, comprises sensing means, which measure water temperature at different stages of the process, and controlling means, which control an applied voltage or an electric current supplied to the EDI device on the basis of these water temperatures. Since the temperature is not directly related to the contaminants level, the use of temperature as a parameter for current regulation in EDI is not satisfactory.

Thus, the prior art methods to control the electric current in an EDI apparatuses are either insufficient, or unreasonably expensive, and a need for simple and reliable method to regulate the electric current and maintain sufficient regeneration degree of ion-exchange material in EDI is present. Furthermore, none of these prior art documents considers or even suggests the ion-exchange resin expansion as a parameter for controlling the electric current.

The solution disclosed here provides a simple way to control the electric current in EDI device. This solution to the problem is less expensive and additionally provides a possibility to optimize energy consumption (operation cost) of deionization, while providing the required quality of produced water and avoiding mechanical damage in the device (such as strong membrane deformation, or internal or external leaks).

Accordingly and advantageously, the present invention provides devices and methods that address one or more of the issues discussed above, in a simple, efficient and cost-effective way.

The invention provides a device for the removal of ions from a polar liquid, in which the device comprises electrodes, at least one compartment which comprises at least one inlet for an entering polar liquid flow and at least one outlet for an outgoing deionized liquid flow, in which said compartment an electrochemically regenerable ion-exchange material fills a zone through which zone a liquid flow is able to pass, the device being characterized in that it comprises at least one sensor of at least one dimensional change of the ion-exchange material filling said zone.

The compartment is generally a diluate compartment or purification compartment because it produces a purified and diluate liquid. This zone is a purification zone or diluate zone.

A compartment is, according to the invention, composed of an ion-exchange media and a frame which is a plastic element which keeps the media inside it. The diluate compartment is a compartment in which, according to the invention, there is at least a diluate zone in which the deionization can take place. A module is, according to the invention, an assembly of compartments and electrodes.

If more than one diluate compartment is comprised in the device, then preferably only one diluate compartment comprises, according to the invention, the sensor of at least one dimensional change. The other diluate compartment(s) can comprise means for cushioning at least one dimensional change of the ion exchange material filling a sector of said compartment. These means are for example a spring combined with a porous flow distributor, or a flexible wall situated inside said compartment, such as a damper of said dimensional change. This would advantageously decrease the risk of damaging elements of said diulate compartment, such as housing, membrane(s) and flow distributor(s). These means for cushioning would also advantageously provide an homogeneous packaging of the ion exchange material inside a sector of said compartment, with a suitable density and a good contact with said elements of the compartments themselves. They would also advantageously prevent a flow channeling while providing good electrical conductivity during a process of use of the device according to the invention.

The sensor is an element able to detect, and preferably to detect and register, at least one dimensional change of the ion-exchange material. The sensor is generally an apparatus or a piece of an apparatus. Said dimensional change usually occurs at a displacement of the ion-exchange material's boundary during the use of the device in a process for the removal of ions from a polar liquid. Said displacement can be a linear displacement.

The dimensional changes of the ion-exchange material are mainly the change of volume of said material inside the compartment, causing a mechanical stress. This change of volume depends on the ionic content of the material. The volume of the ion-exchange material in its regenerated form is usually larger than its volume in salt form. For example a typical cation-exchange material comprising 8% by weight of cross-linking agent has a 7% larger volume in $H^+$-ion form than that in $Na^+$-ion form. A typical anion-exchange material comprising 8% of cross-linking agent has a 20% larger volume in $OH^-$ ion form than that in $Cl^-$-ion form.

When the ion-exchange material is constituted by rigid spherical beads, these beads change their diameter with respect to their ionic form, thus leading to a corresponding change of the total volume (three dimensions) of the bed formed by these beads. For example, if a bed of ion-exchange material fills completely a compartment restricted on all sides by walls, an increment of the total volume of the bed will create a mechanical stress on the walls of the compartment.

The degree of expansion and the mechanical stress caused by the expanded resin is dependent on the type, the cross-linking degree and the regeneration degree of the ion-exchange material, as well as on geometric parameters of the compartment and on the amount of ion-exchange material originally placed into this compartment. It also varies with temperature, mechanical properties of membranes and frames, and other parameters as known from the one skilled in the art.

A preferable location of the sensor is completely within the compartment where a strongest change of resin expansion is expected.

According to the invention, the mechanical stress created by the expansion of resin is measured by at least one sensor of mechanical stress, for example a piezoresistive sensor, a magnetoresistive sensor, or a magnetostrictive sensor, preferably mounted into the frame of the compartment, and is used as a parameter for the control of the electric current via the resin expansion, which is a measure of the regeneration degree. The signal of this sensor of mechanical stress is preferably provided to an electronic device controlling the electric current applied to the EDI device. The measurement of the mechanical stress inside the compartment is advantageously used to sufficiently control the electric current which is to be applied to the compartment to produce water of required quality without damaging the compartment.

In a variant, the sensor comprises a sensor of mechanical stress which is generally placed entirely inside or in contact with the zone. For example the sensor of mechanical stress is mounted into the frame of the compartment, e.g. on a wall of said frame. The stress measured by said sensor is a sum of the hydraulic water pressure inside the compartment and an additional stress created mechanically by the ion-exchange resin material which swells.

The sensor of mechanical stress can also comprise a piezoresistive sensor, a magnetoresistive sensor, a magnetostrictive sensor, or of another type as known from the one skilled in the art such as a linear variable differential transformer. The sensor of mechanical stress generally determines the position of the ion-exchange material's boundary, and is able to generate a signal in relation with this position. The signal outgoing from the sensor is typically used as a parameter for the control of the electric current.

The sensor of mechanical stress can be used in relation with supporting members, such as springs and plates, providing better accuracy of the mechanical stress measurement. In a preferred embodiment, the position of the ion-exchange material's boundary is fixed by a plate, supported generally by a spring. In another embodiment, the sensor of mechanical stress is a movable part, for example a rod, driven by the ion-exchange material, and this movable part is mechanically connected with a movable part of a potentiometer regulating the electric current.

According to the invention, the sensor can comprise a photo-sensor generally placed outside the compartment.

According to a preferred implementation, the sensor comprises a photo-sensor which comprises a mechanical element, generally placed inside or in contact with the zone, and a photo-detector of the displacement of said mechanical element which comprises a transceiver, placed generally outside the compartment, and wherein the compartment around the mechanical element has at least one transparent wall (or window) so that the optical signal from the transmitter to the receiver can cross said compartment adjacent to the mechanical element.

The description is neither limited to the type of device (design of module, sensor, etc), nor to the supporting members (spring, fixtures, etc) if any, nor to the type of sensor. The electric current control disclosed here can be applied to different concepts of EDI devices (with mixed bed, with layered or separated beds, etc), and using different ion-exchange materials in the device (bed of resin beads, ion-exchange blocks, etc). The transmission of the signal from the sensor to the controller as well as from the controller to the EDI-power supply can be done by means of wires, as well as by different wireless technologies. The regulation of electric current can also be done regarding the expansion of the ion-exchange material in a concentrate compartment and/or in an electrode compartment, if such a measure is considered to be more advantageous for certain configurations of EDI.

According to the invention, the device can also comprise another sensor, generally different from the sensor according to the invention, which is able to measure the hydraulic pressure of the liquid flow which can circulate through the zone (and only this hydraulic pressure). If the sensor according to the invention reacts to both the mechanical stress created by the expanded ion-exchange material and the hydraulic pressure of liquid, additional measurements of the hydraulic pressure of polar liquid should be deducted from the measurements carried out by the sensor according to the invention. Thus more accurate measurements of the dimensional changes of the ion-exchange material can be obtained.

The sensor according to the invention is usually able to measure the hydraulic pressure of the liquid inside the compartment and the dimensional changes of the ion-exchange material while the other sensor is able to measure the hydraulic pressure of the liquid inside the compartment. For example, if another sensor monitors the pressure downstream of the compartment, and if the sensor according to the invention inside the compartment monitors the stress, the measurements of these two sensors can be used to calculate the mechanical stress caused by the ion-exchange material. In case the gauge pressure downstream of the device is close to zero (for example flow to a tank at atmospheric pressure), the measurements of the stress on a sensor placed close to the outlet of the compartment, for example a diluate compartment, can be considered as the measurement of the mechanical stress due to dimensional changes of the ion-exchange material in this compartment. Also in case a constant pressure of liquid is provided in wide range of flow rates, e.g. using a pressure regulator or a check-valve, the additional monitoring of this hydraulic pressure is generally not required and a predefined and constant value of hydraulic pressure is usually subtracted from the measurements of the sensor inside the compartment, to deduce the mechanical stress of the resin expansion.

In a variant, the device according to the invention comprises an apparatus connected to the sensor and, preferably, this apparatus connected to the sensor is able to analyze the dimensional change of the ion-exchange material and to control the electric current conducted through said compartment or through the device.

The invention also comprises a method for the removal of ions from a polar liquid wherein at least a part of said polar liquid passes as a stream through an electrochemically regenerable ion-exchange material located in a compartment where an electric field is applied so that the ions to be removed migrate, the method comprising a step of controlling the electric current conducted through said compartment, the method being characterized in that it includes a step of measuring at least one dimensional change of the ion-exchange material and in that the step of controlling the electric current takes into account this dimensional change of the ion-exchange material.

The step of controlling the electric current is at least related to the electric current in the compartment, but it can also control the current in the device in which the compartment is comprised.

In one embodiment, the migration of the ions to be removed is preferably in a direction opposed to the stream flow through said ion-exchange material. Thus, the flow of liquid used for ion removal can be directed opposite, i.e. countercurrent, to the migration of ions inside the ion-exchange material. The corresponding ions from the feed stream will be removed by ion-exchange, will further migrate inside ion-exchange material and will finally be released at the electrode to a concentrate stream going to waste.

The ion-exchange material is generally continuously regenerated electrochemically. Thus, the ions from the feed stream can be continuously exchanged and a flow substantially free of corresponding salt ions is obtained.

The regeneration degree of said material is used as a parameter for controlling the electric current, via the change of the volume of said material.

The characteristics of the polar liquid can change over time because of the instability of upstream treatment (for example effect of temperature, scaling, fouling or aging) or by quality changes of water utilized by the system (change of source by water supplier, seasonal changes, etc.). Also the flow rate through the EDI can vary during the lifetime of the module. Advantageously, the method of the invention gives a method operating with all these changing conditions with a good level of control of the electric current.

Typical liquid used as polar liquid is pre-treated water, such as permeate of reverse osmosis, nanofiltration or ultrafiltration.

The principle of the methods and devices of the present invention used to remove ionic and ionizable components from a polar liquid can be applied not only to aqueous electrolyte solutions, but also to solutions in other polar solvents or in the water/polar solvent mixtures.

Preferably, the maximum allowed mechanical stress which determines the maximum value of electric current for the EDI device is defined experimentally for each design of EDI device. If this maximum is achieved, then the controller will decrease the electric current conducted through the compartment to prevent excessive expansion of the resin and subsequent strain on the frame and on membranes. This will decrease the risks of possible leaks and the energy consumption of the compartment. A lower limit of mechanical stress can be also set to restrict electric current. For example, if the ratio between the salt form and the regenerated form of the resin decreases, the resin beads shrink and the mechanical stress received by the sensor can disappear. In this case, the controller should increase the electric current strength to reach a value above the set minimum value.

The period of time between the changes of electric current and the expansion of the resin should be taken into account by the controller. The system can take a long time to reach a steady state, where the resin expansion corresponds to a new applied current, and this fact must be considered in the control of the electric current. The details of the control (regulation) algorithms and communication between the sensor, the controller and the power supply are not described in detail in this and are easily accessible to one skilled in the art.

Nevertheless, possible ways of current regulation are described here without specifying the details of the algorithms.

The expansion of the resin bed in the EDI device is measured with certain predefined intervals. The time between measurements is to be selected according to module design and dimensions, as well as operating conditions. It can last from few minutes to few hours of operation. Preferably several measurements are done and an average measurement is calculated and considered.

A certain range of resin expansion, registered by a sensor, is defined as an "optimal range", where no adjustment is done and the module is working under constant electric current.

There are two ranges of "acceptable" expansion out of this optimal range, where the electric current is regulated. If the expansion is lower than what it is in the optimal range, the electric current is to be increased. The increment of current increase can be predetermined or it can depend on the difference between the measured value of the expansion and the predefined corresponding optimal value, e.g. the increment will increase proportionally to this difference. The time between the moment when electric current is changed and when a next measurement of expansion is taken into account can be fixed or it can vary, e.g. depending on increment of electric current strength.

If the expansion is in an "acceptable range" but higher than the optimal range, the electric current is to be decreased in a way similar to the way described above.

An expansion out of the optimal and acceptable ranges is undesirable. When the expansion of the resin bed is unacceptably low, this can lead to a decline of produced water quality. When the expansion of the resin bed is unacceptably high, this can lead to inefficient energy consumption and possible leaks. If the expansion is unacceptably low, the electric current can be set to a maximal value, e.g. to a preset value or the highest current available for the power supply, aiming to facilitate regeneration of resin and approach resin expansion to the optimal range. If the expansion is unacceptably high, the electric current can be set to a minimal value, e.g. to a preset value or complete switching off the power supply. The expansion in the unacceptable range should be continuously monitored until the measured values move to the acceptable or optimal range.

According to the invention, the step of measuring the dimensional change of the ion-exchange material is carried out by means of a sensor.

In an embodiment, the sensor comprises a photo-sensor.

In a preferred embodiment, independent or not of the previous embodiment, the sensor comprises a sensor of mechanical stress.

The invention also discloses a method further comprising a step of measuring the hydraulic pressure of the stream flow which passes through the ion-exchange material.

Preferably, the step of controlling the electric current takes into account the dimensional change of the ion-exchange material without the influence of the hydraulic pressure of the stream flow.

As a variant, the stream flow is regulated by hydrodynamic adjustment of the pressure drop in the outgoing stream.

The presence of an ion-exchange membrane is optional. The fact that, optionally, there is an electrochemically regenerable ion-exchange material placed in the compartment does not necessarily mean that this material completely fills this compartment. This material generally fills a zone in the compartment, for example a zone comprised between two ion-exchange membranes, or between an electrode and an ion-exchange membrane. In any case, the ion-exchange material fills this zone generally as a fixed bed of ion-exchange material.

The hydrodynamic resistance of the device, corresponding to the pressure difference between the entering and the outgoing liquid flows, is closely linked to the design of the device, as it is known form the one skilled in the art.

According to the invention, a device containing anion-exchange material, as described above, can be used for efficient removal of salt anions present in the feed stream. It is also able to remove weakly dissociated acids present in the form of non-dissociated molecules, such as carbonic acid (or $CO_2$), silicic acid, boric acid, etc.

According to the invention, a device filled with cation-exchange material, as described above, can be used for efficient removal of salt cations present in the feed stream. It is also able to remove bases present in the form of non-dissociated molecules, such as $NH_4OH$ (or $NH_3$), amines, etc.

The device described below can be used for the removal of acids or bases from a polar liquid, or for the production of bases or acids from its aqueous salt solution, exchanging corresponding ions by $OH^-$- or $H^+$-ions.

The regenerable ion-exchange material is usually a bed of an ion-exchange resin. More generally, conventional ion-exchange materials are resin beads, high mesh beads of ion-exchange resin, powdered resin, as well as fibrous or porous ion-exchangers. They can be provided as beds or blocks.

For the removal of both cations and anions, i.e. for complete deionization, a solution is the use of two devices in series, one filled with cation-exchange material and the other filled with anion-exchange material. In this case, a preferable sequence of devices in series must be defined considering the types of contamination. For typical contaminants of natural or treated (for example by reverse osmosis) natural waters, the cation-exchange material—anion-exchange material sequence is usually advantageous, but is not limited thereto. If wished, both devices could be integrated inside one housing, without being outside the scope of the invention.

Another solution, advantageously used for complete deionization according to the invention, lies in the use of a device with liquid flow directed counter-current to the electromigration of ions inside the ion-exchange material, wherein a bipolar electrode or an ion-exchange membrane, preferably a bipolar membrane, is utilized for the formation of regenerating $H^+$- and $OH^-$-ions. The use of a bipolar membrane is advantageous, in a case where the polar liquid is an aqueous solution, because it results only in electrochemically enhanced water dissociation into $H^+$- and $OH^-$-ions without formation of gases and other by-products as occurs with electrodes.

Figure 2:
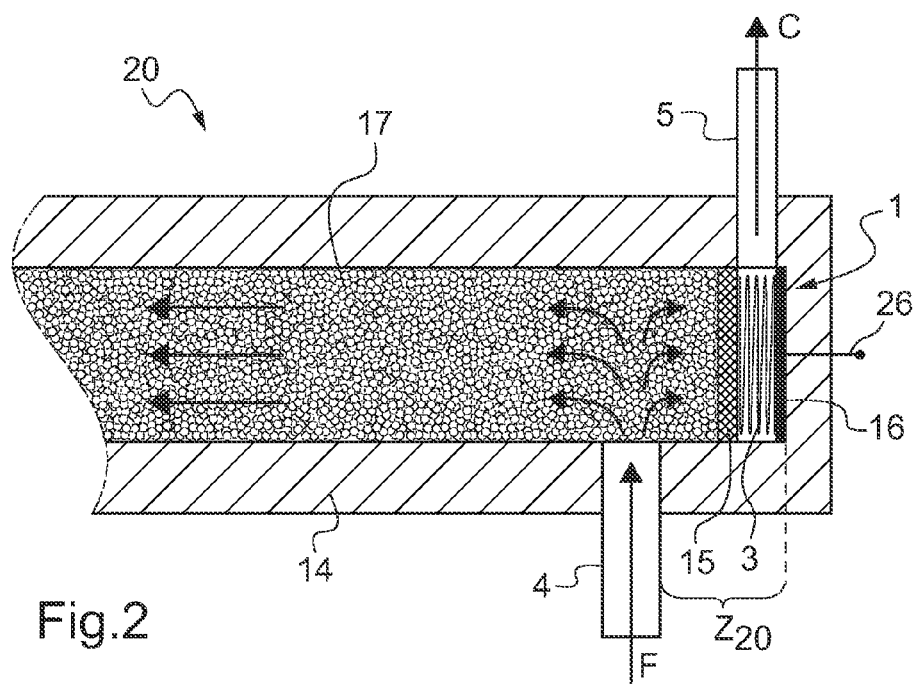
Figure 3:
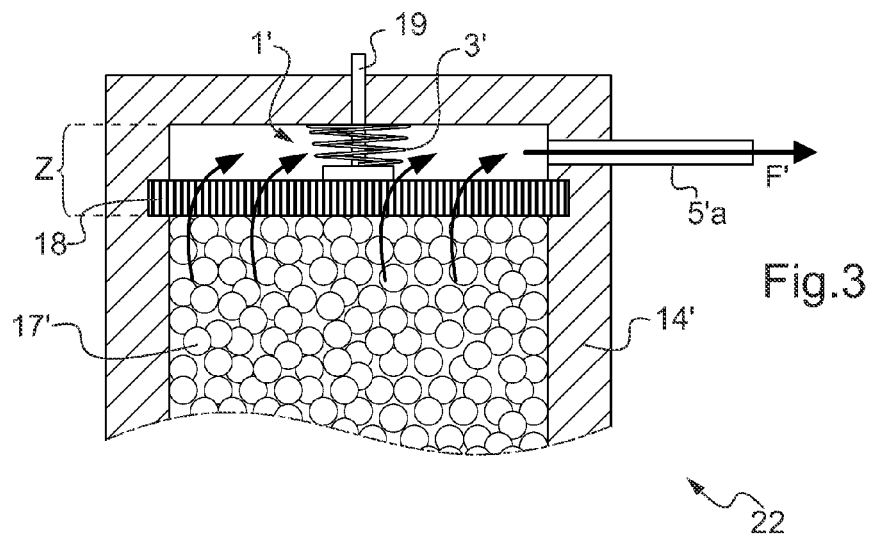
Figure 4:
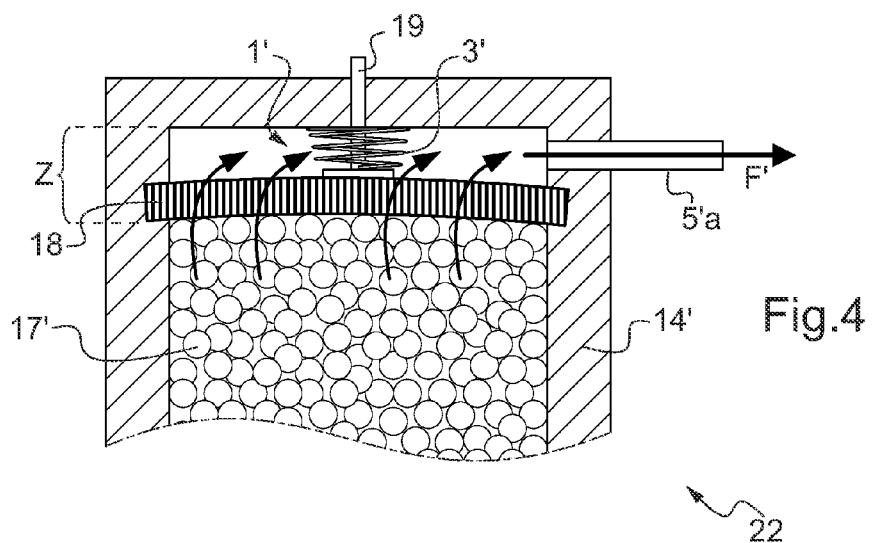
Figure 5:
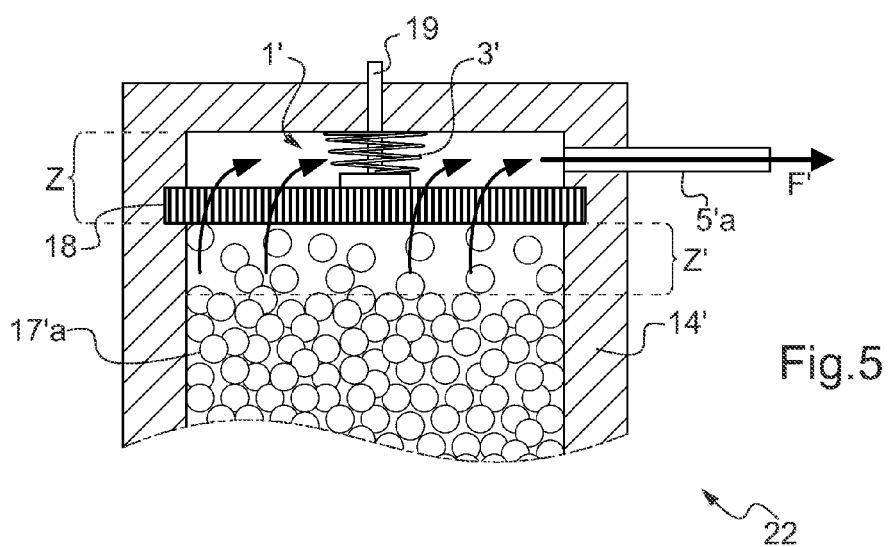
Figure 6:
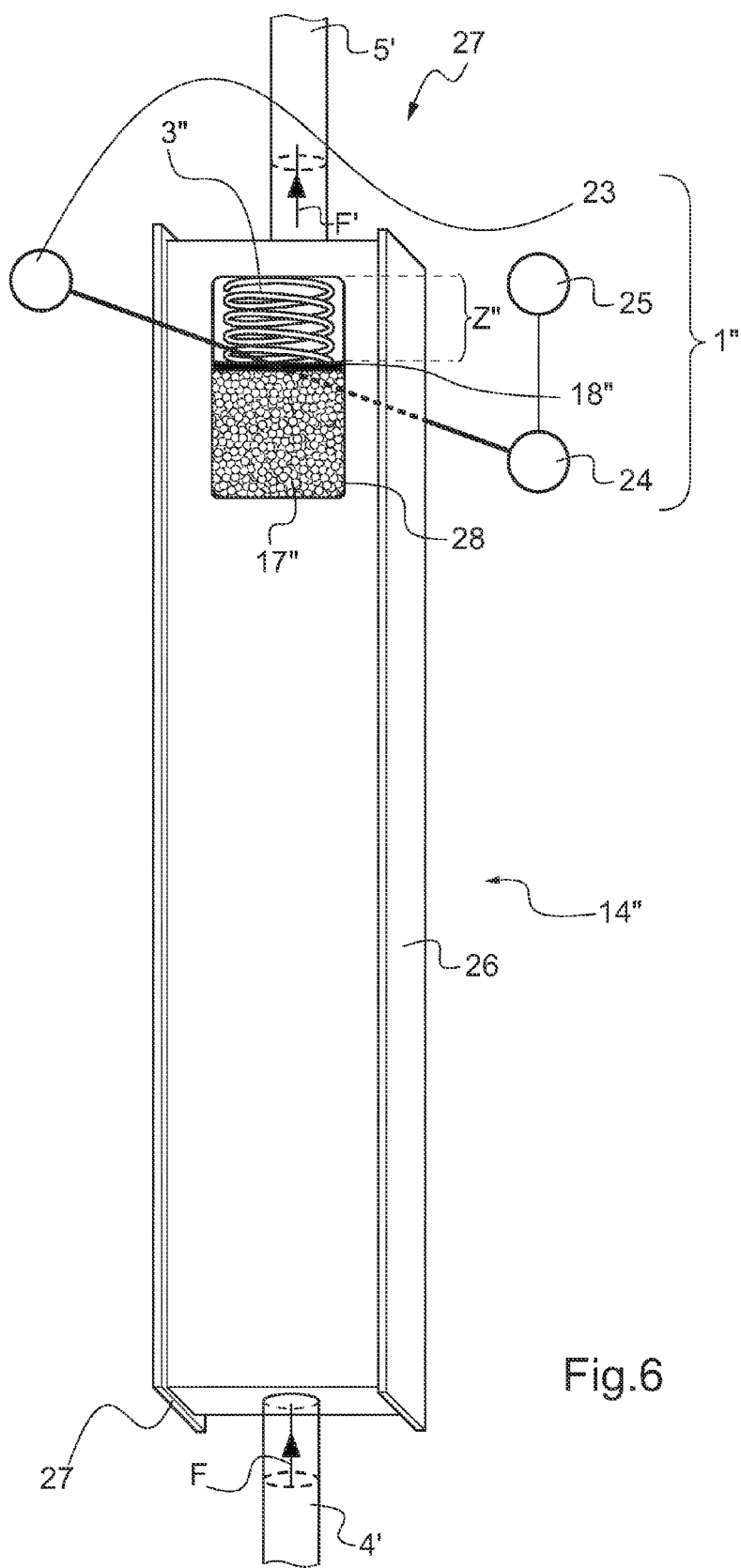

The techniques of the present invention will be readily understood by considering the following detailed description in conjunction with the accompanying drawings, in the case of an aqueous solution to be deionized, in which:

FIG. 1 is a schematic representation of the method according to the invention using any deionization device according to the invention, FIG. 2 is a schematic representation of a first implementation of a deionization device according to the invention, FIG. 3 is a schematic representation of a second implementation of a deionization device according to the invention, when the compartment is full of resin beads, FIG. 4 is a schematic representation of the second implementation of the deionization device according to the invention, when the compartment is full of resin beads, and a mechanical stress is transmitted to the frame, FIG. 5 is a schematic representation of a second implementation of the deionization device according to the invention, when the compartment is not completely full of resin beads, and FIG. 6 is a schematic representation of a third implementation of a deionization device according to the invention.

To facilitate understanding, identical reference numerals have been used, when possible, to designate identical elements that are common to the Figures. The drawings are not to scale and the relative dimensions of various elements in the drawings are depicted schematically and not to scale.

In all the Figures, the compartment is defined by its frame.

FIG. 1 is a schematic representation of the method according to the invention of an EDI device 2 according to the invention.

The device 2 can be used for the removal of anions or for the removal of cations, as well for complete deionization according to the method of the invention.

The entering polar liquid flow (F arrow) enters the device 2 through the inlet 4. The deionized liquid flow or diluate (D arrow) passes out of the device 2 through the outlet 6. Concentrate flow (C arrow) can exit by the outlet 5. Two end plates 7 and 8, each one comprising one electrode, define a module (7, 8) of compartments (9, 14'), all the compartments 9 and 14' being filled with ion-exchange material (not shown) and stacked by the end plates 7 and 8. The compartment 14' is identical to any other compartment 9 except that a mechanical stress sensor 1' is placed inside it, preferably on a wall and close to the outlet 6. This mechanical stress sensor 1' measures the expansion of resin, and provides a signal transmitted to an electronic device or controller 10 via an apparatus 100, which is a Quantity Transmitter (QT) apparatus. This enables a control of the electric current applied to the EDI device 2, by the means of a power supply 11. The electric current is conducted from the power supply 11 to the EDI device 2 through the electric wires 12 and 13.

According to the invention, it would be possible to have a sensor 1' in more than one compartment.

The interdependence of electric current strength and resin expansion can be presented as follows: an increase of electric current through the EDI device 2 implies an increase of regeneration degree of the resin. This increase of regeneration degree of the resin implies an increase of the resin swelling giving rise to stronger expansion of said resin. The control according to the invention is based on the measurement of that expansion of resin bed inside the EDI device, and acts on the strength of electric current.

FIG. 2 is a schematic representation of a first implementation of an EDI device 20 according to the invention. Only a part of this device 20 is represented. This device 20 comprises a frame 14 defining a compartment 14 and a movable flow-through electrode 15. The compartment 14 is a diluate compartment, completely filled with an ion-exchange material, which is shown as a bed of a resin 17. The polar liquid flow enters the compartment 14 by the inlet 4 (F arrow). There is an outlet 5 for the outgoing liquid rinsing the electrode 15 (C arrow). The liquid flow is directed counter-current to the electromigration of ions inside the ion-exchange material 17. A sensor 1, entirely placed in a zone $Z_{20}$ of the compartment 20, comprises a spring 3 present between the movable electrode 15 and the sensor of mechanical stress 16. This sensor of mechanical stress 16 is fixed perpendicularly and connected to a wire 26 connected to the controller (not represented). In this representation, the spring 3 pushes the electrode 15 so that this electrode 15 stays in contact with the ion-exchange material 17. If the ion-exchange material 17 inside the compartment 14 changes the expansion by swelling, the electrode 15 will move and the stress transmitted to the sensor 16 will change. This will lead to a detection of this movement and an estimation of the regeneration degree of the resin. The spring 3 transmits the mechanical stress from the electrode 15 to the sensor of mechanical stress 16.

For example, if the volume of the resin decreases, the electrode 15 will be moved by the spring 3 in the direction to the resin 17. Thus, the mechanical stress transmitted through the spring 3 to the sensor 16 will be reduced.

In case the set lowest mechanical stress is approached, the controller can increase the electric current in order to increase the regeneration degree of the resin 17 whose volume will increase.

This configuration would allow using an ion-exchange material with a low cross-linking degree, which usually shows stronger expansion by swelling.

FIGS. 3, 4 and 5 are schematic representations of a second implementation of a deionization device 22 (partially shown) according to the invention.

The device 22 comprises a compartment 14' defined by its frame, filled by an ion-exchange material 17' as a bed of resin beads. The sensor 1', according to the invention, is placed entirely inside a zone Z of the compartment 14'. The sensor 1' comprises a spring 3', a porous bar 18 which is a flow distributor, and a sensor of mechanical stress 19, in the form of a T element. This porous bar 18 confines the bed of the resin 17' from one side of the compartment 14'. The flow stream flows through the bed of beads 17' uniformly distributed inside the compartment 14', passes through the porous bar 18, and outgoes (F' arrow) the compartment 14' by the outlet 5' a upstream of the porous bar 18. The sensor of mechanical stress 19 is fixed on the bar 18 whose movements are transmitted by the spring 3' from the side opposite to the resin bed 17'. The porous bar 18 can be in plastic material of certain elasticity.

In the case of FIG. 3, the conditions in terms of electric current are normal. The resin expansion is normal: it is within an "optimal range". This is a steady state operation, and the electric current is constant.

In case of excessive expansion of the ion-exchange material shown in FIG. 4, a mechanical stress will be transmitted to the bar 18, which is slightly deformed and transmits a mechanical stress to the sensor 19. Deformation is detected. However the resin expansion is still within the "acceptable range", and the electric current is decreased. If the resin expansion enters a value outside the acceptable range, the electric current would be switched off.

FIG. 5 is another schematic representation of the second implementation of the deionization device according to the invention. The difference with FIGS. 3 and 4 is that the compartment 14' is not completely filled with resin beads. A bed of beads 17' a comprises a zone Z' which is not completely filled with beads. This zone Z' could represent the upper zone of a fluidized bed of the beads. It is a zone of increased electrical resistance. No mechanical stress is transmitted to the sensor 1' and the electric current needs to be increased.

FIG. 6 is a schematic representation in perspective of a third implementation of the deionization device 27 according to the invention, where only one compartment 14" is shown. The compartment 14" is represented very schematically, in order how a photo-sensor is implemented according to the invention.

In this case, a sensor according to the invention 1" comprises a photo-sensor which comprises a transmitter of optical signal or light 23 (as represented in FIG. 6, in front of the compartment 14"), a receiver 24 (as represented in FIG. 6, behind the compartment 14"), and an analyzer 25 which is connected to both the transmitter 23 and the receiver 24. The analyzer 25 is connected to a controller (not shown). A spring 3" is fixed between the compartment 14" and a movable plate 18". The movable plate 18" is considered here as a part of the sensor 1". The ion-exchange material 17", in the form of resin beads, is provided as a bed in the compartment 14". The bed of beads 17" fills the compartment under the movable plate 18" which fixes the position of the resin bed 17" inside the compartment 14". An anion-exchange membrane 26 and a cation-exchange membrane 27 define two side walls of the compartment 14", respectively the right wall and the left wall as represented in FIG. 6. The movable plate 18" is detectable through the transparent window 28. The transparent window 28 forms a part of the front wall (as represented in FIG. 6) compartment 14". The photo-sensor (23, 24, 25) is placed outside the compartment 14". It is able to detect small changes of the plate 18" position, corresponding to the dimensional changes of the volume of the resin 17", making it possible to control the electric current. The flow stream (F arrow) flows through the bed of beads 17" uniformly distributed inside the compartment 14", passes through the porous bar 18" and outgoes (arrow F') the compartment 14" by an outlet 5'.

The invention claimed is:

1. Device for the removal of ions from a polar liquid, in which the device comprises electrodes, at least one compartment which comprises at least one inlet for an entering polar liquid flow and at least one outlet for an outgoing deionized liquid flow, in which said compartment an electrochemically regenerable ion-exchange material fills a zone through which zone a liquid flow is able to pass, wherein the device comprises at least one sensor of at least one dimensional change of the ion-exchange material filling said zone.

2. Device according to claim 1, wherein the sensor comprises a photo-sensor.

3. Device according to claim 1, wherein the sensor comprises a sensor of mechanical stress.

4. Device according to claim 1, wherein the sensor comprises a photo-sensor which comprises a mechanical element and a photo-detector of the displacement of said mechanical element which comprises a transmitter and a transceiver, and wherein said compartment has at least one transparent wall so that the optical signal from said transmitter to said transceiver can cross said compartment adjacent to said mechanical element.

5. Device according to claim 1, comprising another sensor which is able to measure the hydraulic pressure of the liquid flow which can circulate into the zone.

6. Device according to claim 1, comprising an apparatus connected to the sensor.

7. Device according to claim 6, adapted to analyze the dimensional change of the ion-exchange material and to control the electric current that can be conducted through said compartment or through said device.

8. Method for the removal of ions from a polar liquid wherein at least a part of said polar liquid passes as a stream through an electrochemically regenerable ion-exchange material located in a compartment where an electric field is applied so that the ions to be removed migrate,
 the method comprising a step of controlling the electric current conducted through said compartment,
 the method further comprising a step of measuring at least one dimensional change of the ion-exchange material and in that the step of controlling the electric current takes into account this dimensional change of the ion-exchange material.

9. Method according to the claim 8, wherein the step of measuring the dimensional change of the ion-exchange material is carried out by means of a sensor.

10. Method according to claim 9, wherein said sensor comprises a photo-sensor.

11. Method according to claim 8, wherein said sensor comprises a sensor of mechanical stress.

12. Method according to claim 8, further comprising a step of measuring the hydraulic pressure of the stream flow which passes through the ion-exchange material.

13. Method according to claim 12, wherein the step of controlling the electric current takes into account the dimensional change of the ion-exchange material without the influence of the hydraulic pressure of the stream flow.

* * * * *